United States Patent [19]

Lee et al.

[11] 4,155,269
[45] May 22, 1979

[54] TRAVELER AND GUIDE RAIL APPARATUS FOR SCREW DRIVE CLOSURE OPERATOR

[75] Inventors: Maw H. Lee; Barry V. Prehodka, both of Cincinnati, Ohio

[73] Assignee: Clopay Corporation, Cincinnati, Ohio

[21] Appl. No.: 833,822

[22] Filed: Sep. 16, 1977

[51] Int. Cl.² ............................................. F16H 1/18
[52] U.S. Cl. .................................. 74/424.8 A; 49/199
[58] Field of Search .................... 74/424.8 A; 49/199, 49/138, 140

[56] References Cited

U.S. PATENT DOCUMENTS 3,858,452  1/1975  Gatland et al. ........................ 49/199

Primary Examiner—Samuel Scott
Assistant Examiner—Wesley S. Ratliff, Jr.
Attorney, Agent, or Firm—Wood, Herron & Evans

[57] ABSTRACT

Improved traveler and guide rail apparatus for use with a garage door operator includes an elongated guide rail having a longitudinal screw channel and outwardly extending integral flanges disposed along the screw channel. An elongated T-shaped flange extends upwardly from the screw channel. An improved traveler apparatus for use with the guide rail includes a screw-driven traveler and a coupling traveler, each mounted on respective tracks formed by separate outside surfaces of the guide rail. The screw-driven traveler carries a nut engaging a screw in the screw channel through a slot between the flanges and further includes opposed U-shaped channels slidably mounted over the exterior surfaces of the guide rail flanges for slidable movement along the guide rail. The coupling traveler surrounds the screw-driven traveler and a substantial portion of the guide rail and includes a bore in an upper portion thereof, the bore having an interior surface slidably engaging the exterior surface of the screw channel for slidable movement along the guide rail. Upper shoulders of the coupling traveler above the bore are sufficiently close to the T-shaped flange to be guided thereby to prevent undesirable vertical or horizontal movement of the coupling traveler. Also, the coupling traveler is sufficiently relieved in the flange area to accommodate the screw-driven traveler therein. The coupling traveler is further provided with means for connecting it to a garage door, and carries a manually actuable bistable latch for selectively engaging and disengaging the coupling traveler with the screw-driven traveler for respective cooperative and independent slidable movement along the guide rail.

6 Claims, 5 Drawing Figures

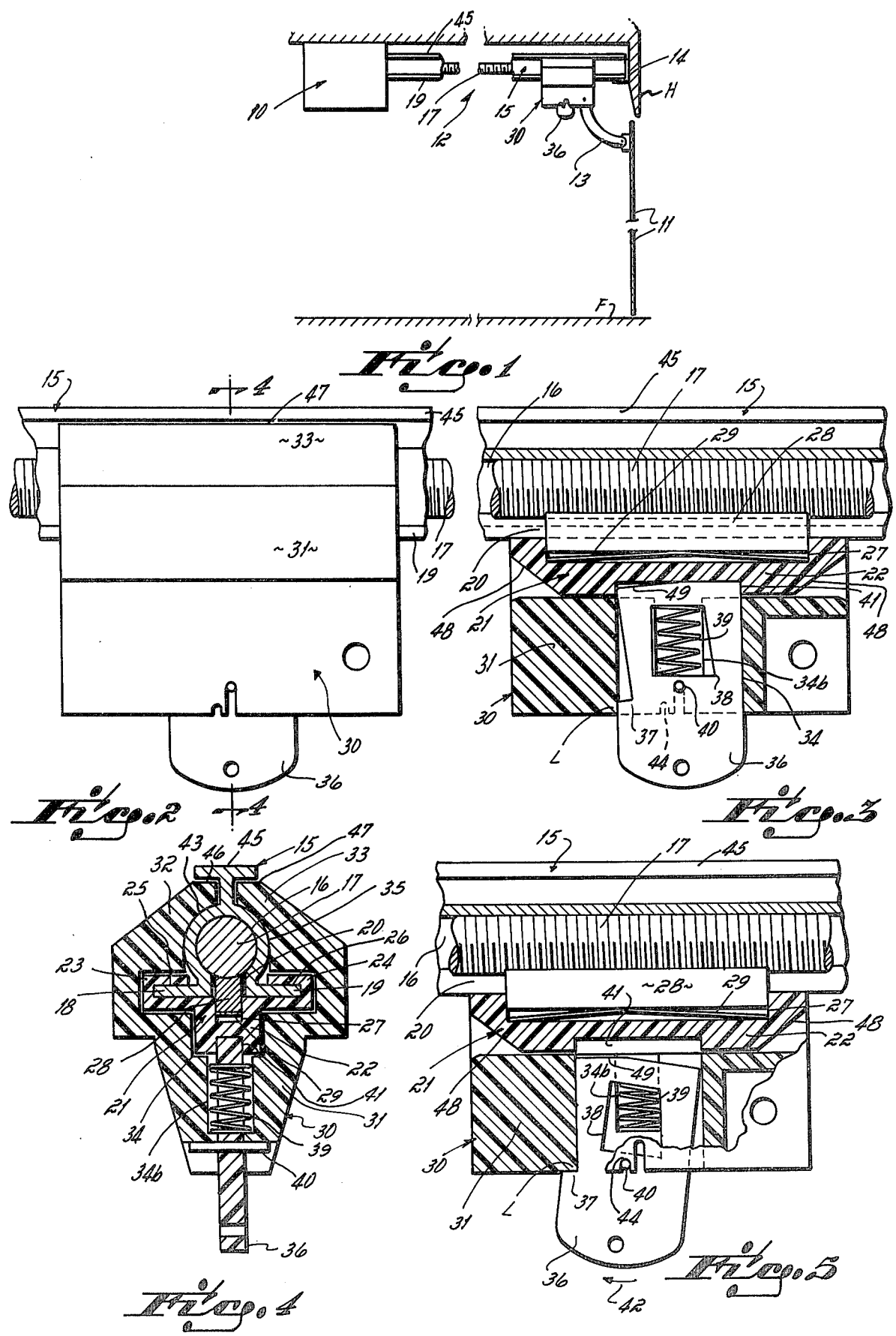

TRAVELER AND GUIDE RAIL APPARATUS FOR SCREW DRIVE CLOSURE OPERATOR

BACKGROUND OF THE INVENTION

The present invention relates to the field of linear drive trains and, more particularly, to improved traveler and guide rail apparatus for screw drive closure operators, such as garage door operators. Specifically, the present invention is directed toward an improved minimal cost traveler and guide rail apparatus for a garage door operator.

U.S. Pat. No. 3,858,452 discloses a linear drive train for a screw drive closure operator which includes an elongated guide rail having a screw channel and a track formed by oppositely disposed U-shaped channels in proximity to the screw channel. A screw is contained within a liner in the screw channel, and the screw engages a nut which is carried by an inner traveler to propel the inner traveler along the interior of the track which is formed by the U-shaped channels. An outer traveler is configured to slide along the exterior of the U-shaped channels and includes a latch to selectively couple the outer traveler to the inner traveler for cooperative movement along the track.

The guide rail includes a substantial amount of material, such as aluminum, a large portion of which is included in the U-shaped channels which form the track. Due to the high cost of aluminum, it is desirable to reduce the amount of material which forms the track so as to reduce the cost of the linear drive train and thus reduce the cost of the operator.

More importantly, it is also desirable to provide an improved guide rail and traveler apparatus wherein the guide rail requires only a minimum of material, and yet the benefits of a two-part traveler and its operation are retained. The maintenance of a two-part traveler apparatus is particularly important in those operators wherein the control device depends on constant positioning of an operative traveler with respect to the screw. For example, such an operator, as is well known, may include a control device having switch actuating control cams driven up and down a positioning lead screw in the control device. A traveler constantly connected to the elongated drive screw is thus required, for, if disconnected, the traveler's position on the screw would be out of register with respect to the position of the control cams. A two-part traveler apparatus, wherein one traveler is constantly connected to the screw is highly desirable and useful.

SUMMARY OF THE INVENTION

To these ends, a preferred embodiment of the present invention provides an improved traveler and guide rail apparatus for a garage door operator wherein an elongated guide rail has a longitudinal screw channel and outwardly extending integral flanges disposed along a lower portion of the screw channel to form a track. An elongated T-shaped flange is disposed along an upper portion of the screw channel to complete the guide rail. The guide rail thus described requires substantially less material, approximately 30 percent less material, than guide rails wherein opposed U-shaped channels form the track as described in the aforesaid patent.

Combined with the improved guide rail is an improved two-part traveler including a screw-driven traveler and a coupling traveler, which are slidably mounted on exterior portions of the guide rail and which can be selectively connected or disconnected from each other while the screw-driven traveler is maintained in engagement with a screw. The screw-driven traveler includes a lower body portion and upper, integral, opposed U-shaped channels slidably fitting over the flanges of the guide rail so as to slidably engage the upper surfaces of the flanges for slidable movement along the guide rail. The screw-driven traveler carries a nut engaging a screw in the screw channel through a slot between the flanges so that rotation of the screw is operative to drive the screw-driven traveler along the guide rail.

The coupling traveler is adapted for connection to a garage door. This traveler surrounds the screw-driven traveler when connected thereto, and substantially surrounds the guide rail. More particularly, the coupling traveler includes a traveler body having a bore through the upper portion thereof, the bore having interior surfaces slidably engaging exterior surfaces of the screw channel for slidable movement along the guide rail. Below the bore, the coupling traveler body is relieved to accommodate both flanges of the guide rail, as well as the screw-driven traveler slidably mounted on those flanges. This permits the coupling traveler to be disengaged from the screw-driven traveler and to be moved along the guide rail over and independently of the screw-driven traveler which remains connected to the screw. The coupling traveler also carries a manually actuable, bistable latch to selectively connect and disconnect the coupling traveler to the screw-driven traveler for respective cooperative and independent slidable movement along the guide rail, respectively.

Upper shoulders of the coupling traveler are operatively and slidably disposed above the bore for engagement with the T-shaped flange of the guide rail to prevent substantial vertical and horizontal displacement of the coupling traveler with respect to the guide rail. This reduces wear on the coupling traveler and, therefore, prolongs the life of the traveler apparatus.

Accordingly, an improved guide rail is provided at a substantially reduced cost, while the improved traveler apparatus, in combination therewith, provides and maintains a desired operation wherein a screw-driven traveler is always engaged with the screw and a coupling traveler is disengagable from the screw-driven traveler for independent movement along the guide rail. This is particularly important for those operators having a control mechanism which requires that a traveler be continually engaged with the screw for positioning and accurate control purposes. These and other advantages will become readily apparent from the following detailed description of a preferred embodiment of the invention and from the drawing in which:

FIG. 1 illustrates a garage door operator including improved traveler and guide rail apparatus in accordance with the present invention;

FIG. 2 is a side elevation of a section of the improved traveler apparatus of the present invention;

FIG. 3 is a cross-sectional view of a portion of the improved traveler apparatus of the present invention;

FIG. 4 is a cross-sectional view along the line 4—4 of FIG. 2; and

FIG. 5 is a cross-sectional view similar to FIG. 3 in which the latch is shown in a retracted position.

Turning now to the drawing, FIG. 1 illustrates a closure operator, such as a garage door operator 10 drivingly connected to a closure or garage door 11 through a linear drive train which is designated generally by the numeral 12. The garage door 11 is of the overhead type and in closed position serves to close an opening between floor F and header H. The garage door operator 10 may be secured to the ceiling of the garage by any suitable means.

The linear drive train 12 is connected to the garage door 11 by means of a pivot arm or bracket 13 and is supported at one end by the garage door operator 10 and at the other end on a bracket 14 which is attached to the ceiling or wall of the garage.

With reference to FIGS. 2 and 4, the linear drive train 12 includes an improved guide rail 15 and an improved traveler apparatus including a screw-driven traveler 21 and a coupling traveler 30. The guide rail is preferably formed as an aluminum extrusion and includes a screw channel 16 in which is disposed a threaded shaft or screw 17. The guide rail 15 also includes oppositely disposed, outwardly extending flanges 18 and 19, which are integral with the screw channel 16 along a lower portion thereof, and a longitudinal slot 20 communicating with the screw channel 16 between the flanges 18 and 19. An elongated T-shaped flange 45 is disposed along an upper exterior surface of the screw channel.

The screw-driven traveler 21 of the improved traveler apparatus includes a central portion 22 and opposed U-shaped channels 23 and 24 which are integral with and extend outwardly from the central portion 22. As shown in FIG. 4, the U-shaped channel 23 fits around the flange 18 and the U-shaped channel 24 fits around the flange 19 such that the U-shaped channels 23 and 24 slidably engage the upper surfaces 25 and 26 of the flanges 18 and 19, respectively. Thus, the upper surfaces 25 and 26 form a first track along the guide rail 15.

The central portion 22 includes a first recess 27 which carries a quarter nut 28 and a leaf spring 29. The leaf spring 29 biases the quarter nut 28 upwardly through the slot 20 into engagement with the screw 17 so that the screw-driven traveler 21 remains in constant operative engagement with the screw 17.

The coupling traveler 30 includes a body section 31 and integral, outwardly and upwardly extending arms 32 and 33 defining a bore 35. As shown in FIG. 4, the interior surface of the bore 35 slidably engages the exterior surface 43 of the screw channel 16 for slidable movement along the guide rail 15. Thus, exterior surfaces 43 form a second track.

The arms 32 and 33 are relieved to fit around the screw-driven traveler 21 in noninterfering relationship with respect thereto so that the screw-driven traveler 21 can be received within the coupling traveler 30. The body section 31 of the coupling traveler includes a cavity 34 which is enlarged by the partial bore 34b as shown in FIGS. 3-5.

A latch includes a plate 36 having a notched edge 37 and an aperture 38. A coil spring 39 is disposed in the aperture 38 which is aligned with the partial bore 34b when the plate 36 is assembled into the cavity 34 of the coupling traveler 30. A retention pin 40 is inserted through the plate 36 to limit vertical movement of the plate 36 in response to the upward bias of the coil spring 39, thereby locking the plate 36 in the cavity 34 of the coupling traveler 30.

As shown in FIGS. 3 and 5, the latch is a bistable latch; that is, the latch has a first position in which the plate 36 extends into a second recess 41 in the central portion 22 of the screw-driven traveler 21 and a retracted position in which the plate 36 is pulled downwardly against the bias of the coil spring 39 in the cavity 34 of the coupling traveler 30 and tilted in the direction of the notched edge (clockwise as shown by the arrow 42 in FIG. 5) so that the notched edge 37 is retained by a lip L of the cavity 34. Preferably, in order to assure that the latch is maintained in the tilted posture when retracted, the coupling traveler 30 is provided with a groove 44 for capture of the retention pin 40 when the plate is pulled downwardly and tilted as shown in FIG. 5.

As shown in FIGS. 3 and 5, tapered surfaces 48 are provided on the central portion of the screw-driven traveler 21 to facilitate coupling of the screw-driven traveler 21 with the coupling traveler 30. A tapered surface 49 is also provided on the plate 36 to further facilitate coupling.

As best shown in FIG. 4, the T-shaped flange of the guide rail 15 extends upwardly through the coupling traveler between the arms 32 and 33. These arms 32 and 33 are preferably provided with shoulders 46 and 47 proximate the T-shaped flange 45 to prevent substantial vertical and horizontal displacement of the coupling traveler 30 with respect to the guide rail 15.

In normal operation, the travelers are interconnected as shown in FIGS. 1-4 so that actuation of the garage door operator 10 causes movement of the garage door 11 as a result of the screw driving the coupled travelers and thus the door. Should it be desired to move the garage door 11 independently of the garage door operator 10, however, the latch is retracted as shown in FIG. 4 so that the coupling traveler 30 is disengaged from the screw-driven traveler 21 and can move independently of the screw-driven traveler 21. At the same time, however, the screw-driven traveler 21 remains positively connected to the screw 17. As the door is moved and the coupling traveler 30 accordingly is moved along the guide rail 15, the coupling traveler simply slides over the U-shaped channels 23 and 24, respectively, being primarily supported by the exterior surface 43 of the screw channel 16. As the coupling traveler 30 moves along the guide rail 15 in sliding contact with the exterior surface 43 of the screw channel 16, the shoulders 46 and 47 prevent substantial vertical and horizontal displacement of the coupling traveler 30 with respect to the guide rail 15 and, therefore, maintain the coupling traveler 30 aligned. This eases independent movement along the guide rail 15 without interference with the screw-driven traveler 21 and facilitates recoupling of the travelers when desired.

Should it be desired to again operate the garage door 11 by means of the operator 10, the latch is returned to the extended position by pulling the plate 36 downwardly and rotating it counterclockwise so that the latch returns to the extended position shown in FIG. 3. Relative movement between the coupling traveler 30 and the screw-driven traveler 21, either by manual movement of the garage door 11 and coupling traveler 30 or by operator 10 movement of the screw-driven traveler 21 brings the travelers together and causes the plate 36 to engage one of the tapered surfaces 48, whereby the plate 36 is cammed downwardly compressing the coil spring 39. When the plate 36 is aligned with the second recess 41, the coil spring 39 drives the plate 36 into the second recess 41 to positively recouple the coupling traveler 30 to the screw-driven traveler 21.

Accordingly, it will be appreciated that applicants have provided an improved, low cost guide rail and at the same time has provided an improved traveler apparatus in combination therewith which maintains a screw-driven traveler in constant screw engagement and nevertheless permits disconnection of the coupling traveler, and the door, from the screw-driven traveler. Each of the travelers is mounted on respective tracks defined by respective outer surfaces of the guide rail, so that simplified rail structure is made possible while providing a two-piece traveler.

The above and other advantages and modifications will become readily apparent to those of ordinary skill in the art without departing from the scope of this invention, and applicants intend to be bound only by the claims appended hereto.

Having fully described the invention, we claim:

1. Improved traveler and guide rail apparatus for use in a closure operator comprising
   an elongated guide rail, said guide rail including a longitudinal screw channel having an outer surface and oppositely disposed flanges integral with and extending outwardly from a lower portion of said screw channel, each of said flanges having an upper surface,
   a longitudinal slot disposed between said flanges and communicating with said screw channel,
   a screw disposed in said screw channel,
   a screw-driven traveler having opposed U-shaped channels fitting around said flanges, portions of said U-shaped channels slidably engaging said upper surfaces,
   means included in said screw-driven traveler for engaging said screw through said slot,
   a coupling traveler having a body section adapted for connection to a closure and having a bore therethrough, said bore having interior surfaces slidably engaging said outer surface of said screw channel, and said body section fitting over said flanges and over said screw-driven traveler in noninterfering relationship therewith, and
   latch means for selectively connecting said coupling traveler to said screw-driven traveler, said latch means having a first position in which said coupling traveler is connected to said screw-driven traveler for cooperative slidable movement along said guide rail with said screw-driven traveler and having a second position in which said coupling traveler is disconnected from said screw-driven traveler for slidable movement along said guide rail independently of said screw-driven traveler.

2. Improved traveler and guide rail apparatus as in claim 1 wherein said guide rail includes a T-shaped top flange and said coupling traveler body section includes shoulder means in operative slidable relationship with said T-shaped flange for abutting against said T-shaped flange to substantially prevent vertical and horizontal displacement of said coupling traveler with respect to said guide rail.

3. Improved traveler and guide rail apparatus as in claim 1 wherein said screw engaging means includes a quarter nut carried by said screw-driven traveler and extending upwardly through said slot to engage said screw about substantially less than one-half of the periphery of said screw and further includes a leaf spring biasing said quarter nut into engagement with said screw.

4. Improved traveler and guide rail apparatus as in claim 1 wherein said latch means comprises a vertically movable plate having a notched edge to enable said plate to be tilted in a direction toward said notched edge, said plate being mounted in a cavity in said body section of said coupling traveler, said cavity having an upper portion with a partial bore and a lower portion, said plate having an aperture, a spring disposed in said aperture and said partial bore and abutting against said lower portion of said cavity to bias said plate upwardly, a retention pin in said plate for limiting upward movement of said plate, a recess in said screw-driven traveler for receiving said plate when said latch means is in said first position, in which said plate is extended into said recess, and said plate in said second position being retracted and tilted so that said notch engages a lip of said cavity to maintain said latch means in said second position wherein said plate is not extended into said recess.

5. Improved traveler and guide rail apparatus as in claim 4 wherein said coupling traveler includes a groove adjacent said notched edge of said plate for releasably capturing said pin when said plate is retracted and tilted.

6. Improved traveler and guide rail apparatus for a screw drive closure operator wherein said guide rail has a screw channel, a first track and a second track, each of said first and second tracks being located on exterior surfaces of said guide rail, and further including a screw-driven traveler slidably mounted on said first track, a coupling traveler slidably mounted on said second track, and means for selectively coupling said travelers together, said coupling traveler nonengagingly disposed around said first track and around said screw-driven traveler when coupled thereto, and being releasable therefrom for movement along said second track independently of and over said screw-driven traveler.

* * * * *